United States Patent
Nishioka et al.

(12)

(10) Patent No.: US 6,440,477 B2
(45) Date of Patent: *Aug. 27, 2002

(54) METHOD OF ADDING FATS AND OILS TO POROUS FODDER

(75) Inventors: Masashi Nishioka; Ryoji Aoyama; Takayuki Ando; Minoru Tanaka, all of Saitama (JP)

(73) Assignee: Nisshin Flour Milling Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,889

(22) PCT Filed: Sep. 5, 1997

(86) PCT No.: PCT/JP97/03140

§ 371 (c)(1),
(2), (4) Date: Feb. 25, 1999

(87) PCT Pub. No.: WO98/09542

PCT Pub. Date: Mar. 12, 1998

(30) Foreign Application Priority Data

Sep. 5, 1996 (JP) .............................. 8-234866

(51) Int. Cl.[7] .............................. A23L 1/326; A23Q 1/12
(52) U.S. Cl. .................... 426/438; 426/448; 426/449; 426/516

(58) Field of Search ................................ 426/281, 805, 426/302, 305, 442, 641, 445, 447, 448, 449, 516, 438

(56) References Cited

U.S. PATENT DOCUMENTS

| | | | | |
|---|---|---|---|---|
| 4,861,606 A | * | 8/1989 | Jensen | 426/305 |
| 4,971,820 A | * | 11/1990 | Likuski et al. | 426/281 |
| 5,102,671 A | * | 4/1992 | Coles | 426/516 X |
| 5,716,655 A | * | 2/1998 | Hamstra et al. | 426/281 X |
| 5,871,802 A | * | 2/1999 | Gao et al. | 426/516 X |

FOREIGN PATENT DOCUMENTS

| | | | |
|---|---|---|---|
| GB | 2232573 | * | 12/1990 |
| JP | 64-20077 | * | 1/1989 |
| JP | 2-138944 | * | 5/1990 |
| JP | 3-180163 | * | 8/1991 |
| WO | 93/14645 | * | 8/1993 |

* cited by examiner

Primary Examiner—Arthur L. Corbin
(74) Attorney, Agent, or Firm—Thompson Coburn LLP

(57) ABSTRACT

A method of adding oil and fat to porous feed is disclosed wherein porous feed together with oil and fat are continuously inserted into a partially evacuated chamber of an oil and fat adding apparatus while, simultaneously, porous feed that has remained therein for a specified time is continuously being removed from the chamber. The continuous nature of this method allows porous feed having high fat and oil content to be produced more rapidly than previously possible.

20 Claims, 4 Drawing Sheets

METHOD OF ADDING FATS AND OILS TO POROUS FODDER

TECHNICAL FIELD

The present invention relates to a method for adding fats and oils to porous fodder in which the fat and oil are added in a higher ratio to the porous feed containing a great amount of voids formed inside.

BACKGROUND ART

Porous feed containing a great amount of voids formed inside are widely known as feeds for pisciculture, etc. As feeds for pisciculture, powders composed solely of fish powder, live fish, pupa etc., kneaded materials thereof, and in addition, pellet type solid feeds etc., processed in the form of solids from compositions prepared by compounding components such as a fish powder, live fish and other components such as vegetable oil cake, cereal powder, starch, vitamins, minerals etc., have been widely used in view of its easy handling, excellent feed making property, etc.

However, solid feeds produced by using a pellet mill etc., have a notable tendency to precipitate and to quickly precipitate once thrown into water. Therefore, such solid feeds are not easily and sufficiently ingested by fish and go rotten at the bottom of water and become causes of water pollution and the generation of sick fish.

For eliminating such defects in solid feeds, there have been produced and used porous feed having floating properties obtained by forming a great amount of voids in pisciculture feed. This porous feed is produced by foaming for a porous structure due to quick vaporization of water when a raw material prepared by compounding various components for feed is kneaded by an extruder and a raw material made into a paste formed by compression heat and pressure in the extruder is extruded into air. Thus produced porous feed floats on a water surface for a long period of time due to a great amount of voids therein and is ingested by fish successfully, and further, is not broken up by water absorption. Therefore, this feed has merits in that it causes little water pollution, etc.

Further, porous feed has been used having high fat and oil content prepared by allowing the above-described porous feed to contain fats and oils in a high ratio since they provide a high growth rate as feeds for pisciculture of young yellowtail, red sea bream, horse mackerel etc.

Conventionally, for adding of fats and oils to porous feed, a raw material prepared by compounding given various components is molded into porous feed by an extruder, then, this feed is dried by a drier utilizing hot air to control the water content thereof, cooled by a cooler, transported to a fat and oil adding apparatus, where fat and oil are added to the porous feed. However, the content of the fat and oil in this case is at most about 15%.

On the other hand, for adding fat and oil in high content, Japanese Laid-Open Patent Publication No. Hei-2-138944 discloses a method in which porous feed is placed under reduced pressure to allow liquid fat and oil to impregnate into the feed. Namely, it is described that porous feed is put into an oil bath and subjected to reduced pressure, however, more efficient production is desired.

DISCLOSURE OF THE INVENTION

The present invention has been accomplished in view of the above-described problems, and an object thereof is to provide a method for adding fat and oil by which a great amount of fat and oil are continuously adhered efficiently on porous feed. The present invention for solving the above-described problems is a method in which porous feed is continuously poured into a fat and oil adding apparatus under reduced pressure together with fat and oil to be added and treated.

As the fat and oil adding apparatus by which fat and oil are continuously added to porous feed while maintaining a reduced condition inside the apparatus, a drum mixer type fat and oil adding apparatus which has conventionally been used or a paddle mixer type fat and oil adding apparatus may be permissible irrespective of mixing type provided reduced condition inside thereof is maintained. Specifically, the entire fat and oil adding apparatus is accommodated and used in a pressure vessel, a rotary valve, a double damper etc., and supply and discharge of porous feed are continuously conducted while maintaining a reduced condition. In this case, it is preferable to use a rotary valve to continue supplying and discharging smoothly.

Regarding the fat and oil adding apparatus, it may be advantageous to use a cylindrical casing in a continuous mixer of a ribbon screw type and to use rotary valves at a supplying port and a discharging port. This mixer has excellent pressure resistance, and can allow addition of fat and oil to be conducted evenly over the whole feed since it is in the form of a cylinder. Further, production is also relatively simple. As the supplying apparatus of fat and oil, a conventional continuous quantitative supplying apparatus may be advantageously placed near the inlet of the fat and oil adding apparatus and thus there is no need to use a special apparatus. Further, the vacuum pump for producing a reduced condition in a fat and oil adding apparatus is not limited by the types thereof.

Alternatively, it may also be permissible that continuous type fat and oil adding apparatuses are placed in multi-stages and addition of fat and oil to porous feed repeated.

Further, in the present invention, a fat and oil adding apparatus may be placed directly after a drier, a cooler may be placed after the fat and oil adding apparatus, and fat and oil are added to porous feed by the fat and oil adding apparatus before the porous feed is cooled.

After being dried by the drier, the product can be modified by given fat and oil addition ratios by passing the product through a continuous fat and oil adding apparatus kept at a reduced condition whether or not the product is one which is cooled by a cooler or a porous feed at high temperature directly after the drier. Particularly if porous feed at high temperature is not cooled and passed through the fat and oil adding apparatus kept at a reduced condition, the volume of a cooler plated in a latter stage can be suppressed since then water is dispersed and evaporated from the porous feed at a high temperature and water content accordingly decreases, and consequently, water content and temperature simultaneously decrease while maintaining the same fat and oil adding ratio. In this case, the volume of the vacuum pump is increased by the vaporization volume of water, for maintaining a reduced condition. Further, there is also a case in which treatment for allowing a rotary valve to have heat resistance is necessary. Moreover, measurements such as keeping moisture etc., may be conducted to prevent dew formation etc., on the mixer casing.

The addition ratio of fat and oil can be improved also by maintaining a reduced condition to a certain extent in a fat an oil adding apparatus, and when it is from −400 to −700 mmHg, the addition ratio can be higher. When the degree of vacuum is lower than −400 mmHg, greater improvements in the addition ratio are not obtained, and even when the degree of vacuum is increased over −700 mmHg, further increases in the addition ratio are not obtained and equipment, such as a pressure resistant apparatus etc., becomes large, therefore such degrees of vacuum are not practical.

Regarding additions of fat and oil to porous feed, the content of fat and oil contained in a raw material itself is from 5 to 10%, the content of fat and oil added before granulation is from 5 to 10%, or more, and the content of fat and oil added by a fat and oil adding apparatus is from 5 to 10%, therefore, the total fat and oil addition ratio of the final porous feed is from 15 to 30%.

BEST MODE FOR CARRYING OUT THE PRESENT INVENTION

A method for adding fat and oil to porous feed according to the present invention will be described below referring to the attached drawings.

Figure 1:
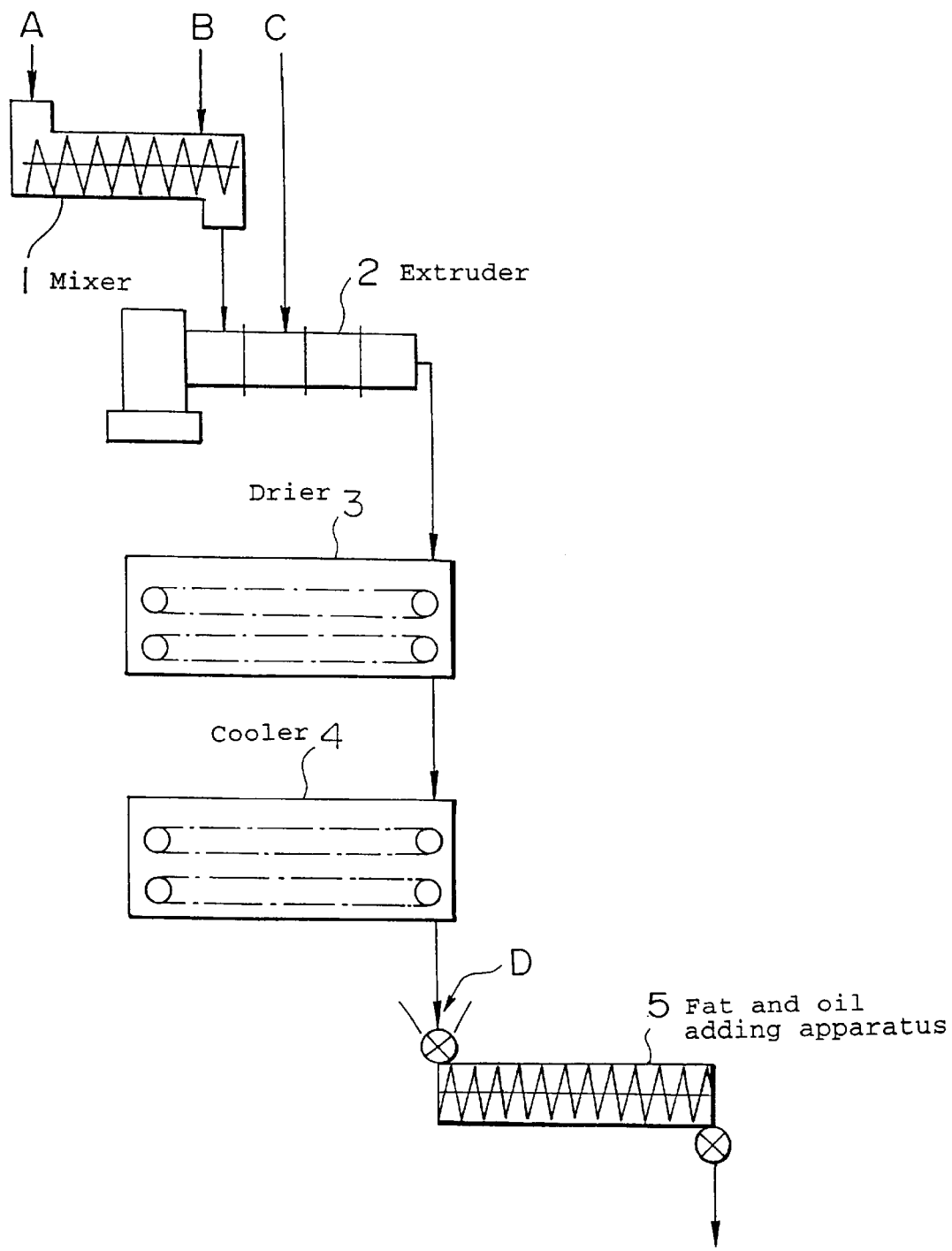
FIG. 1 is a flow chart showing Example 1 of a method for adding fat and oil to porous feed according to the present invention.

FIG. 1 shows a flow chart of one embodiment for carrying out a method for adding fat and oil to porous feed. In the figure, 1 represents a mixer for mixing raw materials, 2 represents an extruder for pressuring and kneading by adding vapor, 3 represents a drier, 4 represents a cooler, and 5 represents a fat and oil adding apparatus.

For adding fat and oil, first, a mixed raw material prepared by compounding appropriately various components for feed is poured into a mixer 1 (as shown by an arrow A), then, to this is added fat and oil, water and vapor (as shown by an arrow B) and heating and mixing are conducted, and the resulting mixed raw material is poured into an extruder 2. In the extruder 2, vapor is added to the raw material as shown by an arrow C and the mixture is pressurized and kneaded, extruded and molded, then, dried by a drier 3, and the dried material is cooled by a cooler 4. In this way, there is formed porous feed in the form of a pellet set at a given water content and temperature. The porous feed is fed into a fat and oil adding apparatus 5 maintaining a reduced condition for further addition of fat and oil, and stored inside for about 2 minutes, to this is added fat and oil, then, discharged out of the fat and oil adding apparatus 5. Thus, fat and oil in a given amount are added to porous feed.

Thereafter, various apparatuses for carrying out the fat and oil adding method will be described in detail.

The extruder 2 is composed of a mixer, a screw which constitutes an extruding portion, a case thereof, a die provided on the leading end of the case, etc. When various components for feed are weighed in a previous stage and poured in, the components are mixed and extruded by the screw in the case, and when the resulting mixture is extruded through die pores provided on the tip of the die, it is allowed to swell to form a great amount of voids therein to obtain porous feed. Further, a rotary type cutter is provided at the tip of the die, and the porous feed is cut into a given length by the rotary type cutter and molded into a given size. The porous feed at this moment has a temperature from 60 to 90° C. and a water content of 20 to 25%.

The drier 3 is a band type apparatus which dries the porous feed by hot air, and the porous feed is dried to such extent that the water content becomes the required 7 to 8%. The temperature of the porous feed at the outlet of the drier 3 is from 70 to 100° C. The cooler 4 is an apparatus which introduces outer air to the inside and makes the introduced outer air to contact the porous feed to cool the feed to a given temperature.

Figure 4:
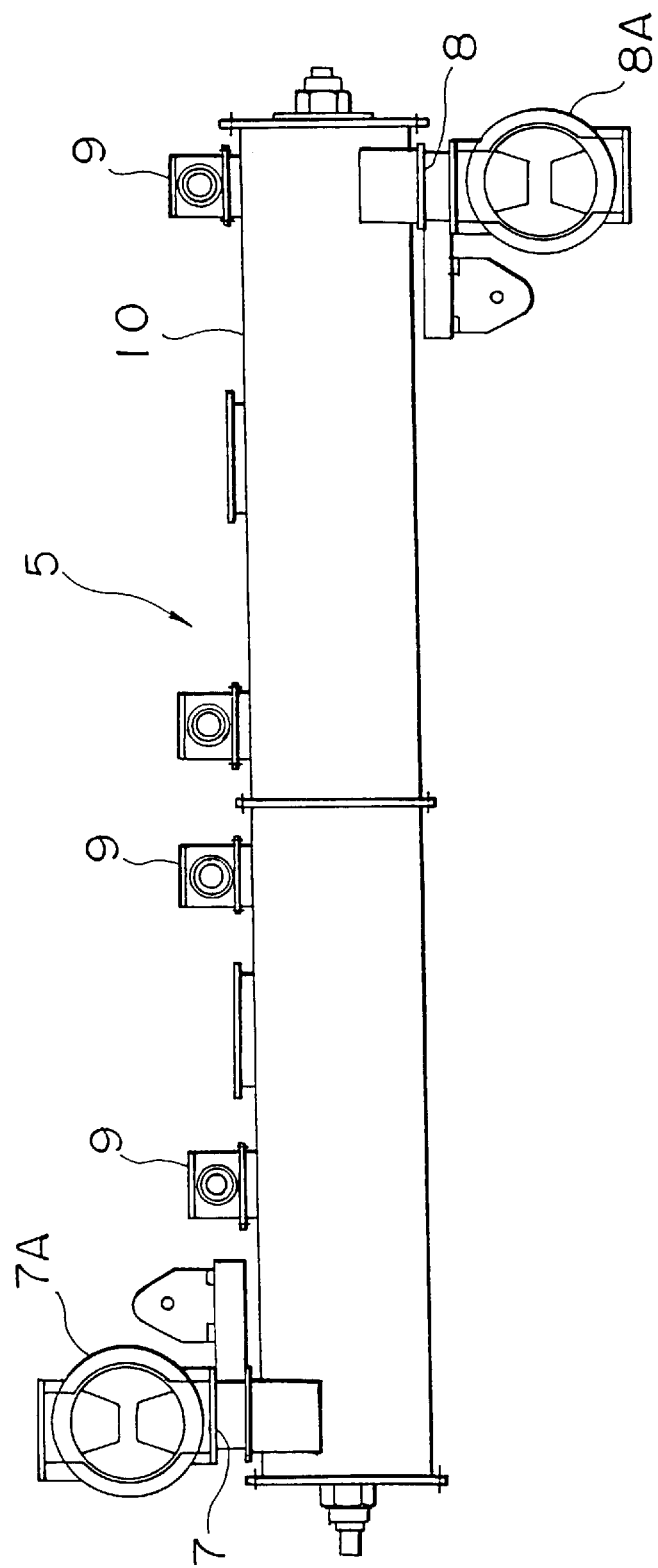
FIG. 4 is a front view of a continuous type fat and oil adding apparatus for decompression used in the present invention.

The external view of the fat and oil adding apparatus 5 is shown in FIG. 4. The fat and oil adding apparatus 5 is composed of two-compartment rotary valves 7A and 8A, and a ribbon screw type continuous mixer 6, and piping is connected to a vacuum pump (not shown) from a vacuum discharge tube-connecting port, namely a vacuum exhaust port 9, and the pressure inside is reduced. The degree of decompression by the vacuum pump is not constant and may vary, and may be opened to atmosphere halfway.

Figure 3:
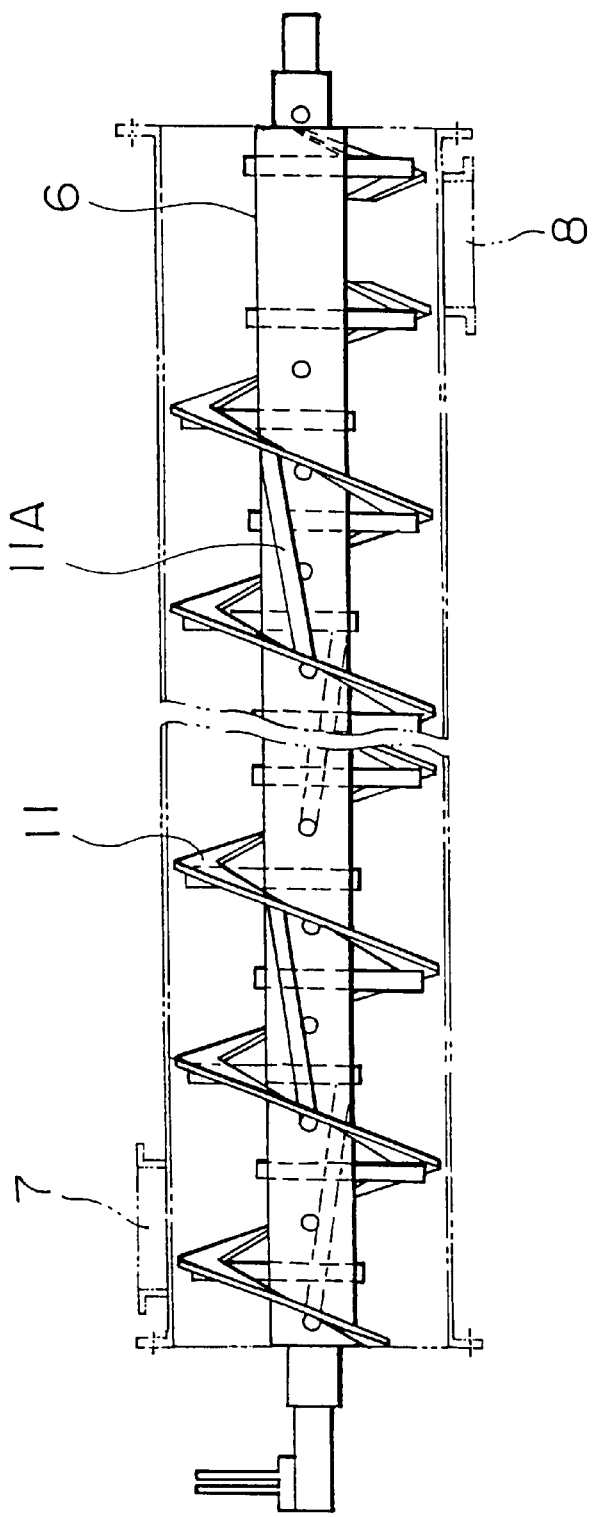
FIG. 3 is a view showing the internal structure of a continuous type fat and oil adding apparatus for decompression used in the present invention.

FIG. 3 shows the internal structure of the fat and oil adding apparatus 5.

As shown in FIG. 3, the fat and oil adding apparatus 5 has a structure in which the ribbon screw type continuous mixer 6 rotates (rotating speed is from 6.5 to 8.5 rpm) in a casing 10. The diameter of the screw is 700 mm, the length thereof is 6000 mm, the blade pitch is 525 mm, the blade number is 11, the width of a ribbon 11 of the ribbon screw type blade 6 is 100 mm. 11A represents an auxiliary blade which is composed of a round tube connecting the stirring ribbon 11 in the axial direction and aids the stirring. When this auxiliary blade 11A is optionally provided, addition of fat and oil becomes more uniform, and in addition, the time during which the porous feed is kept in the fat and oil adding apparatus 5 can be controlled. These auxiliary blades 11A may be placed evenly over the entire length or at every other blade pitch, or the positions thereof may be optional. On the casing 10, there are provided a suitable number of vacuum exhaust ports 9 at appropriate intervals along the longitudinal direction, and the degree of decompression inside is kept at about −−600 mmHg (permissible if it is within the range from −400 mmHg to −700 mmHg).

The fat and oil to be added are continuously mixed with the feed before the vacuum rotary valve 7A. And the mixture is introduced intact into the fat and oil adding apparatus 5 through the rotary valve 7A. The method for quantitative supply of fat and oil for fat and oil addition is not particularly restricted. Further, both may simply be made continuous to flow simultaneously for mixing, and particular atomization of fat and oil, etc., are not required. By thus passing through the apparatuses in order, fat and oil are added to the porous feed. From 5 to 10% of fat and oil are newly added to the porous feed by the fat and oil adding apparatus 5, in addition to the fat and oil (5 to 7%) contained in the raw material and the fat and oil (5 to 10%) added before granulation, to prepare porous feed of high fat and oil content having a total fat and oil content of 20 to 30%.

Other embodiment of the method for adding fat and oil will be described using FIG. 2.

Figure 2:
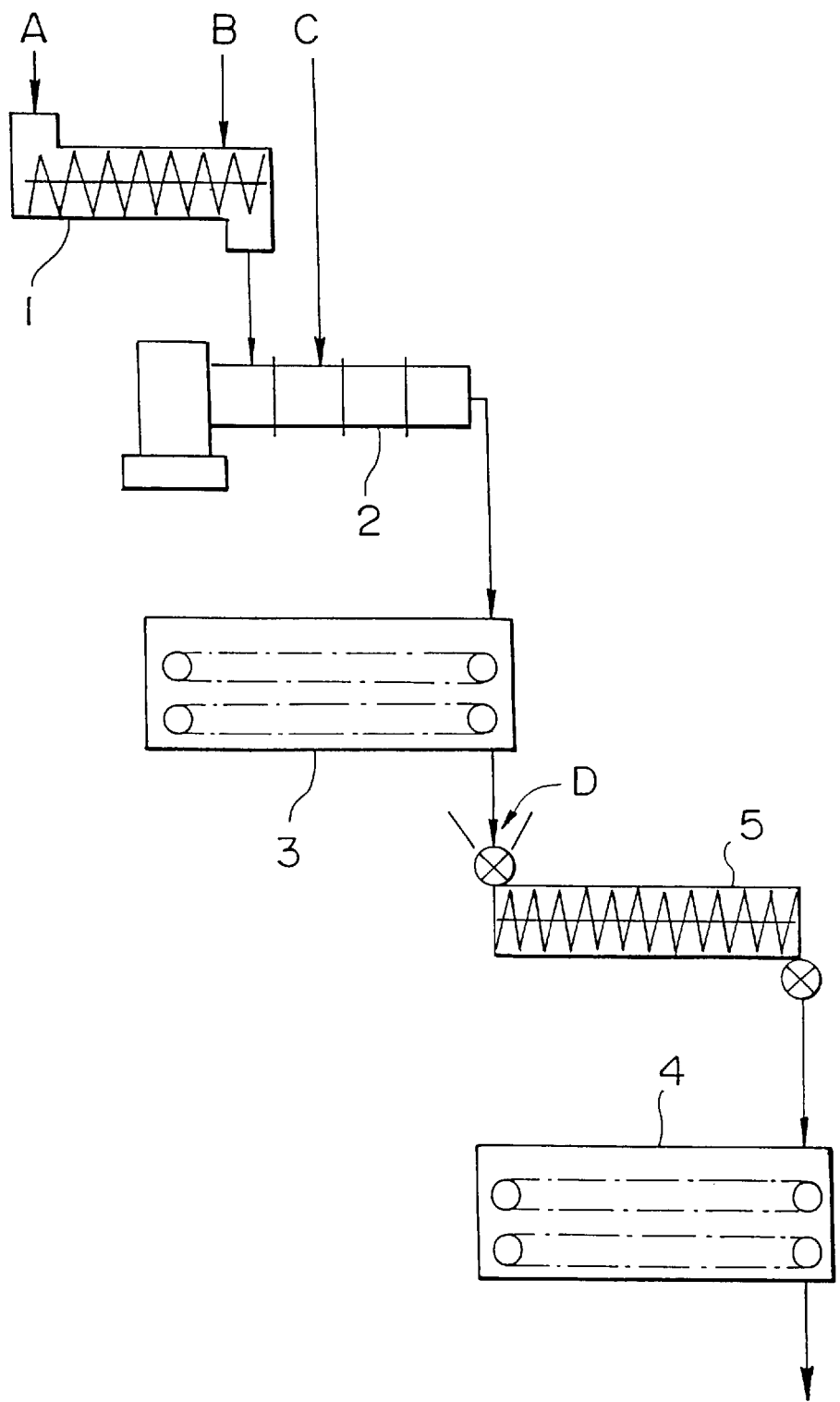
FIG. 2 is a flow chart showing Example 2 of a method for adding fat and oil to porous feed according to the present invention.

FIG. 2 shows a flow chart of the second embodiment of the method for adding fat and oil to porous feed. As shown in FIG. 2, a fat and oil adding apparatus 5 is placed directly after a drier 3, and porous feed is poured into the fat and oil adding apparatus 5 in stages when drying is completed, and fat and oil are added. In this case, a rotary valve 7A, the fat and oil adding apparatus 5 etc., will be subjected to a given heat resistance measurement etc., in view of the high temperatures of the porous feed introduced into the fat and oil adding apparatus 5. Since the addition of fat and oil into porous feed at higher temperatures is conducted at a higher rate than at a normal temperatures, fat and oil can be added in greater amounts than that exhibited in the above-described example 1. Further, there is also an advantage in that the load on the cooler 4 at the latter stage is reduced since water is also partially dispersed from the porous feed.

Next, comparative experiments of the embodiments (Examples 1 and 2) are shown.

(1) Compounding ratio of porous feed used in the experiments is as described below.

| Compounded material | Ratio |
| --- | --- |
| Fish powder | 67.25 |
| Soybean cake | 10.0 |
| Wheat powder (ginkgo) | 7.75 |
| Corn starch | 2.5 |
| Tapioca starch | 12.5 |
| Total | 100.0 |

(2) Operation condition

The air flow rate in the cooler was 4.5 m$^3$/min, the degree of decompression of the fat and oil adding apparatus was from −600 to −620 mmHg, and the retention time was 2 minutes.

(2) Experiment results

EXAMPLE 1

| | Material temperature At outlet, (° C.) | Water content at outlet, (%) | Fat and oil addition ratio, (%) |
| --- | --- | --- | --- |
| Drier | 80 | 9.0 | |
| Cooler | 20 | 8.0 | |
| Fat and oil adding apparatus | 20 | 8.0 | 7.0 |

EXAMPLE 2

| | Material temperature at outlet, (° C.) | Water content at outlet, (%) | Fat and oil addition ratio, (%) |
| --- | --- | --- | --- |
| Drier | 80 | 11.3 | |
| Fat and oil adding apparatus | 50 | 8.3 | |
| Cooler | 20 | 8.0 | 11.0 |

The measuring positions are respective outlets.

When the results of the above-described experiments are compared with Examples 1 and 2, it is known that the cooler is subjected to temperature reduction by 60° C. in Example 1, while the temperature reduction by 30° C. is effected in Example 2, therefore, the load on the cooler is reduced much more under conditions of Example 2.

(3) The method for measuring fat and oil addition ratios and measurement results are as follows.

A pellet composed of porous feed having a diameter of 19 mm and a length of 17 mm was maintained in the fat and oil adding apparatus 5 under a degree of decompression of −600 mmHg, and the fat and oil adsorption ratio was calculated from the weight of the pellet before addition and the weight of the pellet after discharge (fat and oil adhered on the surface had been wiped off).

The fat and oil addition ratio was 7% in Example 1, while, in Example 2, the fat and oil addition ratio increased to 11%.

As described above, according to the method for adding fat and oil to porous feed of the present invention, extremely excellent results as described below are obtained.

(1) Fat and oil can be continuously added in high ratio to porous feed.

Further, when a decompression type fat and oil adding apparatus is placed directly after a drier, the following effects (2), (3) and (4) are obtained.

(2) The water content of the product is reduced by adding porous feed having a high temperature under decompression by a decompression type fat and oil adding apparatus. Namely, the drying effect is obtained.

(3) The temperature of the product lowers when passing through a decompression type fat and oil adding apparatus. Namely, the cooling effect is obtained.

(4) Since porous feed having a high temperature enters into a decompression type fat and oil adding apparatus, fat and oil adsorption amounts increase when compared to porous feed of a normal temperature.

Industrial Applicability

According to the method for adding fat and oil to porous feed of the present invention, fat and oil can be added to porous feed for pisciculture etc., at high rate or ratio and continuously, and porous feed containing necessary amounts of fat and oil can be produced efficiently.

What is claimed is:

1. A method for adding fat and oil to porous feed comprising:

providing porous feed directly from an extruder to a drier;

drying the porous feed by heated air in the drier;

inserting the dried and heated porous feed together with the fat and oil into a chamber of a fat and oil adding apparatus, wherein the dried and heated porous feed is inserted directly therein from the drier such that the dried and heated porous feed substantially maintains the temperature it possesses upon exit from the drier, there being a partial vacuum in the chamber of the fat and oil adding apparatus and the inserting of both the porous feed and the fat and oil being performed in a continuous manner such that additional porous feed and fat and oil are constantly being inserted into the chamber of the fat and oil adding apparatus;

keeping the porous feed and the fat and oil in the fat and oil adding apparatus for a specified time; and removing the porous feed from the chamber of the fat and oil adding apparatus after the specified time has elapsed, the removal of the porous feed being performed in a continuous manner such that porous feed is constantly being removed from the chamber of the fat and oil adding apparatus while additional porous feed and additional fat and oil are being inserted therein.

2. A method for adding fat and oil to porous feed according to claim 1, wherein the chamber of the fat and oil adding apparatus has first and second opposite ends and the fat and oil adding apparatus is an apparatus comprising a pair of rotary valves and a ribbon screw, one of the pair of rotary valves being positioned at the first end of the chamber and the other of the pair of the rotary valves being positioned at the second end of the chamber, the rotary valves maintaining the partial vacuum within the chamber while allowing the insertion and the removal of the porous feed from the chamber, the ribbon screw having an axis that extends between the first and second ends of the chamber and being pivotally mounted in the chamber for rotation about its axis, the ribbon screw also having a helical blade that winds about the axis of the ribbon screw in a manner such that the blade of the ribbon screw stirs and moves the porous feed from one of the first and second ends of the chamber to the other when the ribbon screw is revolved about its axis.

3. A method for adding fat and oil to porous feed according to claim 2, wherein the partial vacuum of the chamber of the fat and oil adding apparatus is from −400 to −700 mmHg.

4. A method for adding fat and oil to porous feed according to claim 3, wherein fat and oil are added so that the fat and oil content of said porous feed is from 20 to 30% in terms of weight ratio.

5. A method for adding fat and oil to porous feed according to claim 2, wherein fat and oil are added so that the fat and oil content of said porous feed is from 20 to 30% in terms of weight ratio.

6. A method for adding fat and oil to porous feed according to claim 2, wherein decompression and return to normal pressure of said porous feed by said fat and oil adding apparatus are repeated multiple times.

7. A method for adding fat and oil to porous feed according to claim 1, wherein the partial vacuum of the chamber of the fat and oil adding apparatus is from −400 to −700 mmHg.

8. A method for adding fat and oil to porous feed according to claim 7, wherein fat and oil are added so that the fat and oil content of said porous feed is from 20 to 30% in terms of weight ratio.

9. A method for adding fat and oil to porous feed according to claim 7, wherein decompression and return to normal pressure of said porous feed by said fat and oil adding apparatus are repeated multiple times.

10. A method for adding fat and oil to porous feed according to claim 1 wherein fat and oil are added so that the fat and oil content of said porous feed is from 20 to 30% in terms of weight ratio.

11. A method for adding fat and oil to porous feed according to claim 10, wherein decompression and return to normal pressure of said porous feed by said fat and oil adding apparatus are repeated multiple times.

12. A method for adding fat and oil to porous feed according to claim 1, wherein decompression and return to normal pressure of said porous feed by said fat and oil adding apparatus are repeated multiple times.

13. A method for adding fat and oil to porous feed according to claim 1, further comprising the step of cooling the porous feed after removing the porous feed from the chamber of the fat and oil adding apparatus.

14. A method for adding fat and oil to porous feed according to claim 13, wherein the partial vacuum of the chamber of the fat and oil adding apparatus is from −400 to −700 mmHg.

15. A method for adding fat and oil to porous feed according to claim 14, wherein fat and oil are added so that the fat and oil content of said porous feed is from 20 to 30% in terms of weight ratio.

16. A method for adding fat and oil to porous feed according to claim 13, wherein decompression and return to normal pressure of said porous feed by said fat and oil adding apparatus are repeated multiple times.

17. A method for adding fat and oil to porous feed according to claim 13, wherein the chamber of the fat and oil adding apparatus has first and second opposite ends and the fat and oil adding apparatus is an apparatus comprising a pair of rotary valves and a ribbon screw, one of the pair of rotary valves being positioned at the first end of the chamber and the other of the pair of the rotary valves being positioned at the second end of the chamber, the rotary valves maintaining the partial vacuum within the chamber while allowing the insertion and the removal of the porous feed from the chamber, the ribbon screw having an axis that extends between the first and second ends of the chamber and being pivotally mounted in the chamber for rotation about its axis, the ribbon screw also having a helical blade that winds about the axis of the ribbon screw in a manner such that the blade of the ribbon screw stirs and moves the porous feed from one of the first and second ends of the chamber to the other when the ribbon screw is revolved about its axis.

18. A method for adding fat and oil to porous feed according to claim 17, wherein the partial vacuum of the chamber of the fat and oil adding apparatus is from −400 to −700 mmHg.

19. A method for adding fat and oil to porous feed according to claim 18, wherein fat and oil are added so that the fat and oil content of said porous feed is from 20 to 30% in terms of weight ratio.

20. The method of claim 1 wherein the drying step includes drying the porous feed by heated air in the drier such that, upon exit therefrom, the porous feed possesses a temperature in a range of approximately 70 degrees Celsius to approximately 100 degrees Celsius.

* * * * *